Jan. 13, 1970　　　　　B. MOUISSIE　　　　　3,489,370
SELF-THREADING CINEMATOGRAPHIC PROJECTOR WITH FILM MAGAZINE
Filed Oct. 24, 1967　　　　　　　　　　　　2 Sheets-Sheet 1
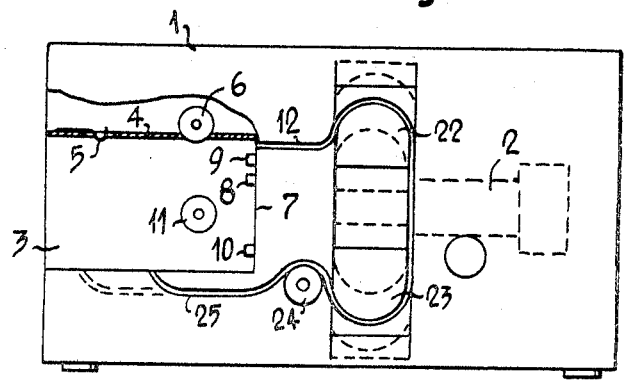
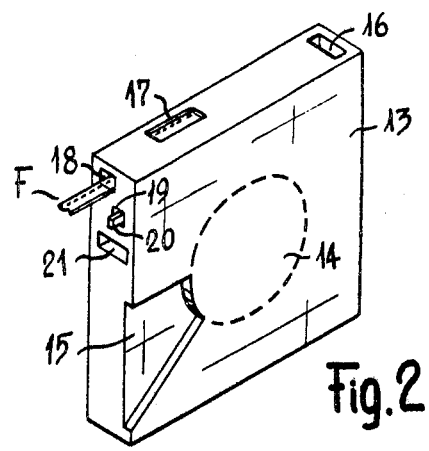
INVENTOR
BOB MOUISSIE
BY　*Emary L. Groff Jr.*
ATTORNEY INVENTOR
BOB MOUISSIE
BY  Emery L. Groff Jr.
ATTORNEY

United States Patent Office 3,489,370
Patented Jan. 13, 1970

3,489,370
SELF-THREADING CINEMATOGRAPHIC PROJECTOR WITH FILM MAGAZINE
Bob Mouissie, Yverdon, Switzerland, assignor to Paillard S.A., Vaud, Switzerland, a company of Switzerland
Filed Oct. 24, 1967, Ser. No. 677,646
Claims priority, application Germany, Nov. 11, 1966, P 28,254
Int. Cl. G03b 1/32
U.S. Cl. 242—198                                        4 Claims

ABSTRACT OF THE DISCLOSURE

A self-threading cinematographic projector adapted to receive film magazines of different sizes includes means for driving the film out of the magazine and moving it to the self-threading mechanism, and also includes means for rewinding the film in the magazine when the projection of the film is over.

One seeks more and more to simplify the manipulation which the user must carry out to project a cinematographic film. It is known to provide on cinematographic projectors guiding devices to ensure the self-threading of the film, that is to say its passage on the various sprocket-wheels of the projector and in the projection gate, as well as bringing the film to the take-up reel.

The present invention seeks to achieve a still more advanced automatism in order to provide maximum ease in film projection.

The invention has for its object a cinematographic projector with a film magazine, characterized in that it comprises magazine positioning means, means for drawing the film out of the magazine, a guiding gate for the automatic positioning of the film, and means for rewinding the film in the magazine.

The accompanying drawing shows, diagrammatically and by way of example, two embodiments of the projector according to the invention.

FIG. 1 is a side view of the projector according to the first embodiment.

FIG. 2 shows in perspective a magazine containing a film spool and adapted to be placed on the projector of FIG. 1.

Figure 3:
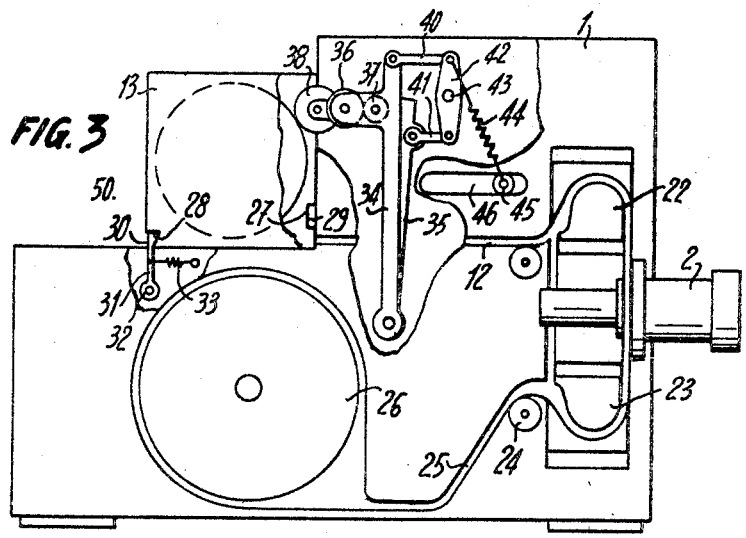
FIG. 3 is a side view of the projector according to the second embodiment.
Figure 4:
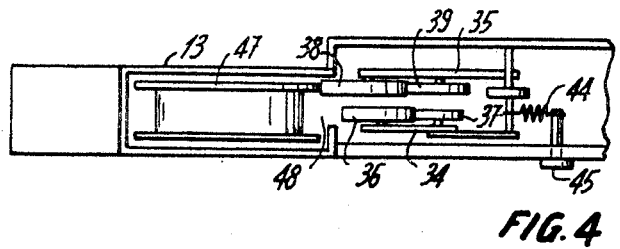
FIG. 4 is a partial plan view of the projector according to FIG. 3, the upper wall of the case being removed.

The projector according to FIG. 1 comprises a case 1 containing all the essential and usual elements of a projector, that is to say: an object-lens 2, an intermittent film driving mechanism, a luminous source, etc.

A cavity 3 opens on one face of the projector and is adapted to receive a magazine of the kind shown in FIG. 2. This cavity is bounded at its upper part by a wall 4 having two orifices, one allowing the passage of the folded end of a spring 5 and the other allowing the passage of a rubber-faced roller 6.

The wall 7 situated to the front of the cavity 3, carries a lug 8 and two push-buttons 9 and 10. In the lower part of the cavity 3 is an additional roller 11 adapted to ensure the rewinding of the film in the magazine placed on the projector.

The magazine shown in FIG. 2 comprises a case 13 containing a film spool, not shown. This spool is mounted on a spindle carrying wheel 14 which is actuated by the roller 11 of the projector due to a recess 15 provided in a wall of the case 13 to permit cooperation between the wheel 11 and the periphery of the wheel 14.

The narrow upper side of the case 13 is provided with a notch 16 adapted to cooperate with the spring catch 5 of the projector. This narrow side is further provided with an aperture 17 beneath which passes the end of the film, as it moves out of case 13 through an opening 18 in another narrow side of the case 13. This narrow side also has an orifice 19 for the passage of a dog 20 which actuates a device for blocking the wheel 14 and the end of the film placed in the case 13. This narrow side of the case also has a notch 21 adapted to cover the lug 8 when the magazine is in place on the projector.

When positioning the magazine on the projector, the former must be placed in a correct position which is defined by the engagement of the lug 8 in the notch 21 of the case 13 and by the engagement of the spring catch 5 in the notch 16.

When positioning the magazine, one side of the latter bears against the push-button 10 of the projector, which places the projector in operative condition and actuates the film driving mechanism.

As soon as the motor of the projector is in operation, it rotates the roller 6 which cooperates with the film F of the magazine through the aperture 17 of the latter. Moreover, the push-button 9 cooperates with the dog 20 to release the wheel 14 and the film contained in the magazine.

The film driven by the roller 6 extends into a groove 12 opening on to one side face of the projector. The film follows the groove so as to pass around two loop-forming elements 22 and 23. The film then passes over a sprocket-wheel 24 and then advances into a groove 25 which leads it to a take-up device, not shown.

It is thus seen that by the mere positioning of the film magazine on the projector, the latter is actuated and automatically brings about the exit of the film from the magazine to bring it to the driving mechanism, then to the film take-up device.

When the projection of the film is finished, the film may be rewound in the magazine due to the roller 11 which permits rotation of the spool contained in the magazine.

It is to be well understood that during projection, means, not shown but known per se, permit bringing together the loop-former elements 22 and 23 so that the loops of the film are free in front of and behind the gate in which the film is advanced by the claw and passes in front of the projection aperture.

FIG. 3 shows a projector of the same kind as that of FIG. 1, but which is arranged so as to permit placing on said projector magazines of different capacities and thus of different dimensions. The magazine 13, shown in FIG. 3, contains a spool having 15 metres of film of 8 mm. gauge.

The projector of FIG. 3 also has a groove 12 adapted to guide the film leaving the magazine 13 so as to cause it to pass around the loop-formers 22 and 23 and in front of the object-lens 2. After passing through the projector gate, the film further passes over a sprocket wheel 24, then through a groove 25 to reach a take-up spool 26 comprising means for ensuring automatic securing of the film on its hub.

The magazine 13 has two notches 27 and 28 adapted respectively to cooperate with a guiding lug 29 and a holding member 30 formed by the nose of an arm 31 pivoting at 32 and subjected to the action of a spring 33.

The projector further comprises two hinged arms 34 and 35. The arm 34 carries a roller 36 with a rubber-faced periphery and engaging a driving pinion 37. Similarly, the arm 35 carries a roller 38 with a rubber-faced periphery, capable of being driven by a driving wheel 39. The two arms 34 and 35 are connected by links 40 and 41 to an arm 42 pivoting on the frame of the apparatus at 43. This arm is subjected to the action of a draw-spring 44 one end of which is connected to a push-button 45 sliding in a longitudinal slot 46.

In the position shown in FIG. 3, the roller 38 is in contact with the periphery of a rim of the spool 47 enclosed in the magazine 13, so as to permit the rewind of the film on said spool. Said roller 38 bears elastically against the rim of the spool under the action of the spring 44 which causes the arm 42 to pivot in a clockwise direction and to push the lever 35 towards spool 47 by means of the link 41. At the same time, the arm 42 exerts a pull by the link 40 on the lever 34 to separate roller 36 from the film spool 47.

When the push-button 45 is moved to the left, relative to FIG. 3, in the slot 46, the arm 42 is urged by said spring in a counterclockwise direction as soon as the line of action of the spring passes to the left of the pivot 43 of the arm 42. The movement of the arm then separates the roller 38 from the rim of the spool 47 and brings the roller 36 into contact with the outer loop of the film winding carried by said spool 47.

As soon as the magazine 13 has been positioned on the projector, the push-button 45, which may moreover be connected to the starting knob of the projector or may even comprise said knob, is moved to the left, so that upon starting the projector, the roller 36 rotates the film wound in the magazine 13 in the direction corresponding to its unwinding. Means, not shown, comprising for example a deflector placed in the magazine 13 cause the end of the film to turn aside so as to insert it in the groove 12. In this way, the insertion of the film may be ensured by the loop-formers 22, 23 and the sprocket-wheel 24 until said film fixes itself to the spool 26. Thereafter, the push-button 45 may be moved to rotate the arm 42 and separate the roller 36 from the spool 47, whereas the roller 38 enters into contact with the latter. The roller 38 is driven by means of a free wheel mechanism which permits this roller to rotate freely in the direction corresponding to the unwinding of the film. On the other hand, if one reverses the running of the projector, either to effect a partial projection in reverse, or to ensure the rewinding of the projected film, the free wheel mechanism ensures the drive of the roller 36 and thereby of the spool 47.

Figure 5:
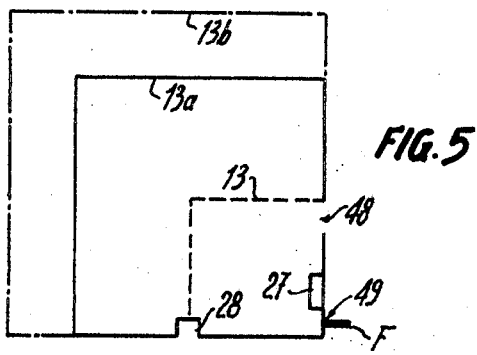
FIG. 5 shows, very diagrammatically, three magazines of different capacity, capable of being placed on the projector of FIG 3.

FIG. 5 shows the superposed silhouettes of three types of magazine, that is a magazine 13 of a capacity of 15 metres of film and shown in dash lines, a magazine 13a of a capacity of 60 metres and indicated in full lines, and a magazine 13b of a capacity of 120 metres and shown in dot and dash lines. It will be seen that the positioning means which are constituted by the notches 27 and 28 are disposed in the same manner for the three types of magazine, as well as the outlet 49 for the film F. Due to this arrangement and to the fact that the space 50 on the projector, which is provided for receiving of the magazines, is sufficiently large, it is possible to selectively place on the projector magazines corresponding to the three types shown in FIG. 5. Of course, there is nothing to prevent the possibility of placing magazines of larger capacity, for example 240 metres. The magazines 13, 13a or 13b each have an opening 48 for the passage of the rollers 36 and 38, said opening being always at a definite distance relative to the fixing notches 27 and 28.

What is claimed is:

1. A self-threading cinematographic projector with a film magazine, comprising a magazine receiving space, magazine positioning means, means for rewinding the film in the magazine, said last mentioned means including a first roller movable into and out of said magazine receiving space, an element cooperating with said roller for driving the film into said magazine in order to ensure the rewinding of the film, means for automatically driving the film out of the magazine and moving it to the self-threading mechanism, said last mentioned means including a second roller movable into and out of said magazine receiving space, and cooperating with the outer loop of the film winding of the magazine to drive the film out of said magazine.

2. A projector according to claim 1 including a free wheel mechanism driving said first roller which permits said roller to rotate freely in the direction corresponding to the unwinding of the film from the magazine.

3. Projector according to claim 1, wherein the element cooperating with said first roller for driving the film into said magazine comprises a film reel having at least one flange, and means for moving said first roller into driving position relative to said flange.

4. A projector according to claim 1, including a control mechanism for said first and second rollers said control mechanism disposed so as to prevent the simultaneous movement of said rollers in said space.

References Cited

UNITED STATES PATENTS 3,291,409 12/1966 McClellan _____ 242—55.13 X
3,386,675 6/1968 Thomsen _____ 242—55.13

LEONARD D. CHRISTIAN, Primary Examiner

U.S. Cl. X.R.

352—157

Notice of Adverse Decisions in Interferences

In Interference No. 97,930 involving Patent No. 3,489,370, B. Mouissie, SELF-THREADING CINEMATOGRAPHIC PROJECTOR WITH FILM-MAGAZINE, final judgment adverse to the patentee was rendered Jan. 18, 1973, as to claims 1 and 3.

[*Official Gazette May 8, 1973.*]